United States Patent
Brock et al.

(10) Patent No.: US 6,431,200 B2
(45) Date of Patent: Aug. 13, 2002

(54) WELDABLE MOUNT FOR FUEL SYSTEM COMPONENT

(75) Inventors: Michael S. Brock, Connersville, IN (US); Jeffrey E. Devall, Gwent (GB)

(73) Assignee: Stant Manufacturing Inc., Connersville, IN (US)

(*) Notice: Subject to any disclaimer, the term of this patent is extended or adjusted under 35 U.S.C. 154(b) by 0 days.

(21) Appl. No.: 09/780,770

(22) Filed: Feb. 9, 2001

Related U.S. Application Data
(60) Provisional application No. 60/181,747, filed on Feb. 11, 2000.

(51) Int. Cl.$^7$ ............................................. F16K 24/04
(52) U.S. Cl. ...................... 137/202; 137/43; 137/587
(58) Field of Search ....................... 137/43, 202, 587

(56) References Cited

U.S. PATENT DOCUMENTS

| | | |
|---|---|---|
| 3,021,029 A | 2/1962 | McKinlay |
| 4,219,126 A | 8/1980 | Oana |
| 4,351,350 A | 9/1982 | Crute |
| 4,352,364 A | 10/1982 | Orsino et al. |
| 4,413,804 A | 11/1983 | Lanius et al. |
| 4,646,772 A | 3/1987 | Bergsma |
| 4,655,238 A | 4/1987 | Szlaga |
| 4,660,714 A | 4/1987 | Suzuki et al. |
| 4,694,870 A | 9/1987 | Vize |
| 4,702,268 A | 10/1987 | Ambruster et al. |
| 4,715,403 A | 12/1987 | Szlaga |
| 4,721,283 A | 1/1988 | Wilson |
| 4,730,652 A | 3/1988 | Bartholomew |
| 4,742,844 A | 5/1988 | Szlaga |
| 4,753,262 A | 6/1988 | Bergsma |
| 4,779,637 A | 10/1988 | Ubaldi |
| 4,960,153 A | 10/1990 | Bergsma |
| 4,966,189 A | 10/1990 | Harris |
| 5,028,244 A | 7/1991 | Szlaga |
| 5,069,423 A | 12/1991 | Amorese et al. |
| 5,083,583 A | 1/1992 | Benjey |
| 5,139,043 A | 8/1992 | Hyde et al. |
| 5,253,668 A | 10/1993 | Mills |
| 5,318,069 A | 6/1994 | Harris |
| 5,404,907 A | 4/1995 | Benjey et al. |
| 5,443,098 A | 8/1995 | Kertesz |
| 5,640,993 A | 6/1997 | Kasugai et al. |
| 5,680,848 A | 10/1997 | Katoch et al. |
| 5,775,357 A | 7/1998 | Regna et al. |
| 5,782,262 A | 7/1998 | Kim |
| 5,954,091 A | 9/1999 | Leadford |
| 6,035,883 A | 3/2000 | Banjey |
| 6,085,771 A | 7/2000 | Benjey et al. |
| 6,189,567 B1 | 2/2001 | Foltz |

FOREIGN PATENT DOCUMENTS

| | | |
|---|---|---|
| EP | 0597314 A1 | 10/1993 |
| WO | WO 99/27284 | 6/1999 |

*Primary Examiner*—Gerald A. Michalsky
(74) *Attorney, Agent, or Firm*—Barnes & Thornburg

(57) ABSTRACT

A vent apparatus is adapted to be coupled to a fuel tank and includes a valve housing made of a non-weldable plastics material and containing a valve. The vent apparatus further includes a tank mount made of a weldable plastics material and coupled to the valve housing. The tank mount is adapted to be welded to an underlying fuel tank to support the valve housing within a mounting aperture formed in the fuel tank. The tank mount is coupled to the valve housing by a retainer ring formed to include an annular channel opening toward the valve housing. The valve housing includes an annular upper flange extending into an upper region of the annular channel formed in the retainer ring. The tank mount includes an annular lower flange extending into a lower region of that annular channel to mate with the overlying annular upper flange and trap a flange seal therebetween.

29 Claims, 4 Drawing Sheets

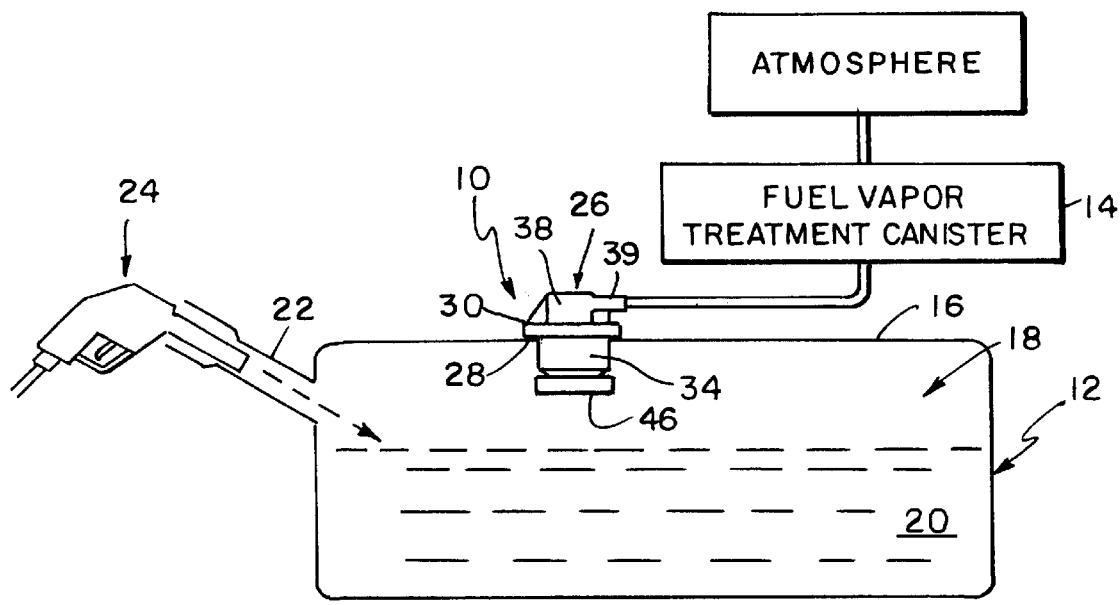
FIG. 1
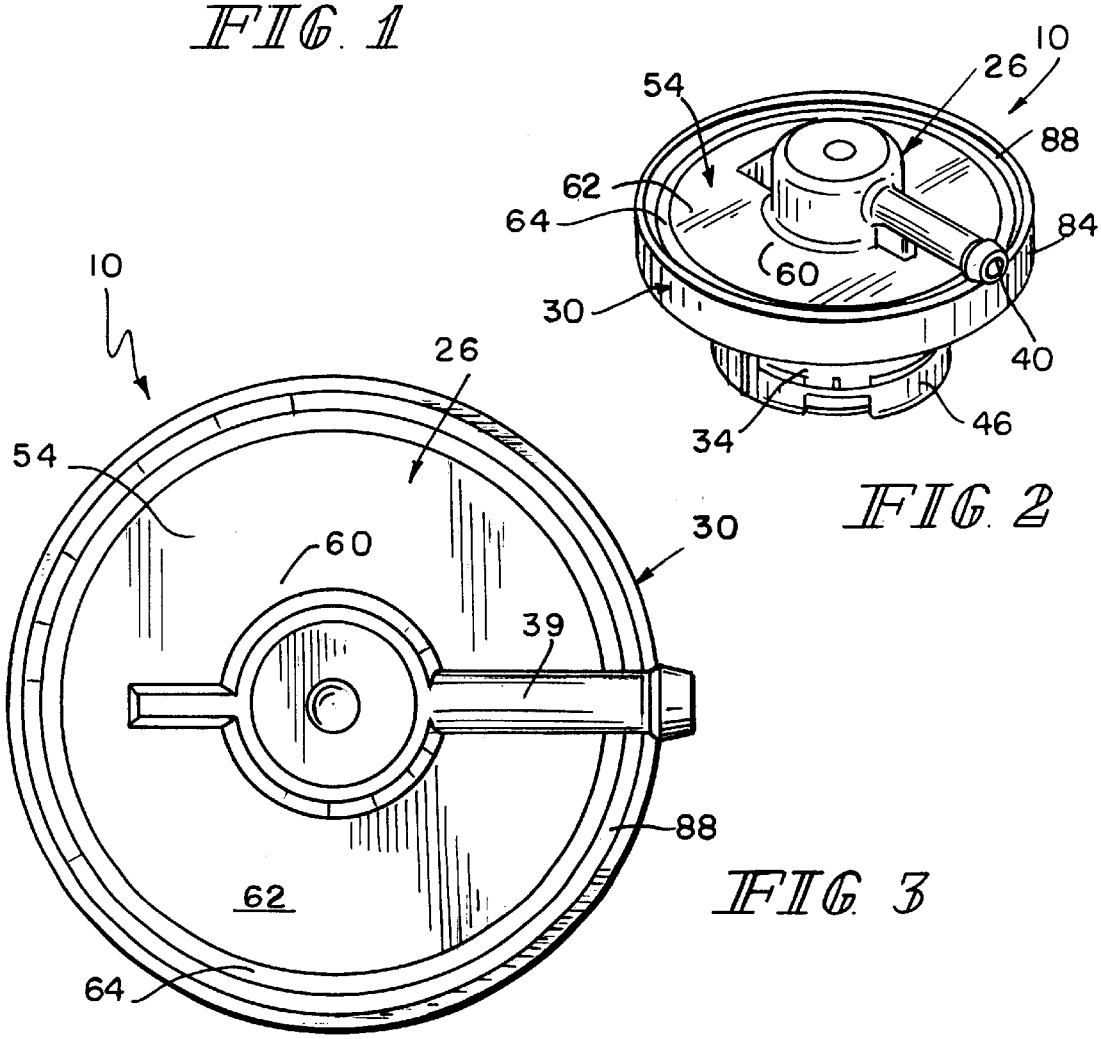
FIG. 2
FIG. 3

WELDABLE MOUNT FOR FUEL SYSTEM COMPONENT

This application claims priority under 35 U.S.C. §119(e) to U.S. Provisional Application Serial No. 60/181,747, filed Feb. 11, 2000, which is expressly incorporated by reference herein.

BACKGROUND AND SUMMARY OF THE INVENTION

The present invention relates to a weldable mount, and in particular, to a mount adapted to be welded to a base made of a plastics material. More particularly, the present invention relates to a fuel system component adapted to be mounted on a vehicle fuel tank made of a plastics material using a weldable mount.

Mounting assemblies are used to mount a venting valve assembly in a top wall of a fuel tank. See, for example, U.S. Pat. No. 4,966,189 to Harris and PCT International Publication Nos. WO 99/27284 to Foltz and WO 00/7309 to Amburgey et al., each of which is incorporated by reference herein. Further, U.S. Pat. No. 5,404,907 to Benjey et al. and U.S. Pat. No. 5,139,043 to Hyde both relate to weldable vapor vent valve systems and are also incorporated by reference herein.

According to the present invention, a vent apparatus is adapted to be coupled to a fuel tank. The vent apparatus includes a valve housing made of a non-weldable plastics material and containing a valve. The vent apparatus further includes a tank mount made of a weldable plastics material and coupled to the valve housing. The tank mount is adapted to be welded to an underlying fuel tank to support the valve housing within a mounting aperture formed in the fuel tank.

In preferred embodiments, the tank mount is coupled to the valve housing by a retainer ring formed to include an annular channel opening toward the valve housing. The valve housing includes an annular upper flange extending into an upper region of the annular channel formed in the retainer ring. The tank mount includes an annular lower flange extending into a lower region of that annular channel to mate with the overlying annular upper flange and trap a flange seal therebetween.

Features of the present invention will become apparent to those skilled in the art upon consideration of the following detailed description of preferred embodiments exemplifying the best mode of carrying out the invention as presently perceived. The detailed description particularly refers to the accompanying figures in which:

FIG. 1 is a diagrammatic view of a vent apparatus in accordance with the present invention mounted on the top wall of a fuel tank containing liquid fuel and having a filler neck receiving a fuel-dispensing pump nozzle;

FIG. 2 is a perspective view of a preferred embodiment of the vent apparatus of FIG. 1;

FIG. 3 is a top plan view of the vent apparatus of FIG. 2;

Figure 4:
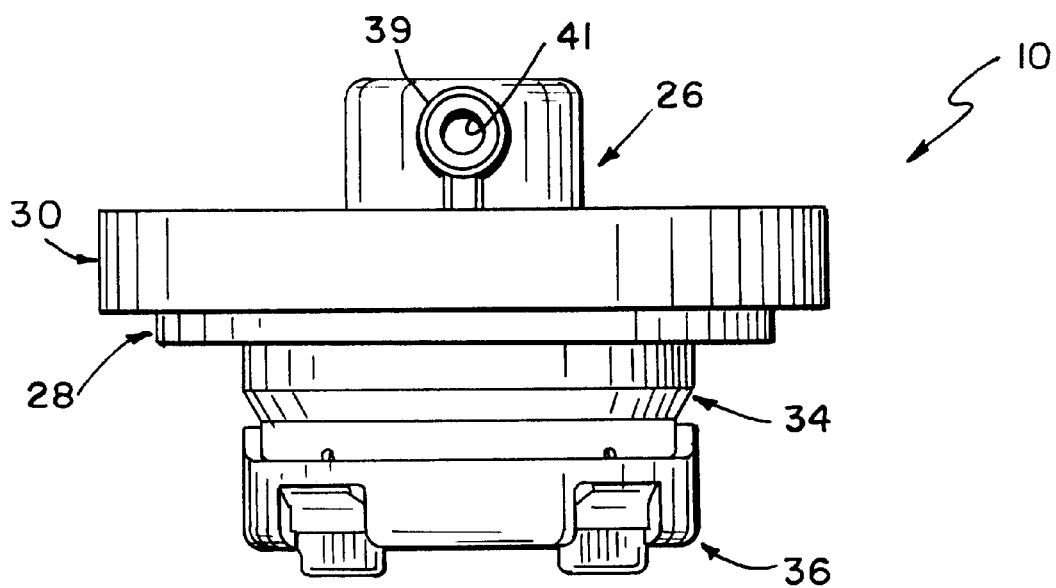
FIG. 4 is a side elevation view of the vent apparatus of FIG. 2.
Figure 5:
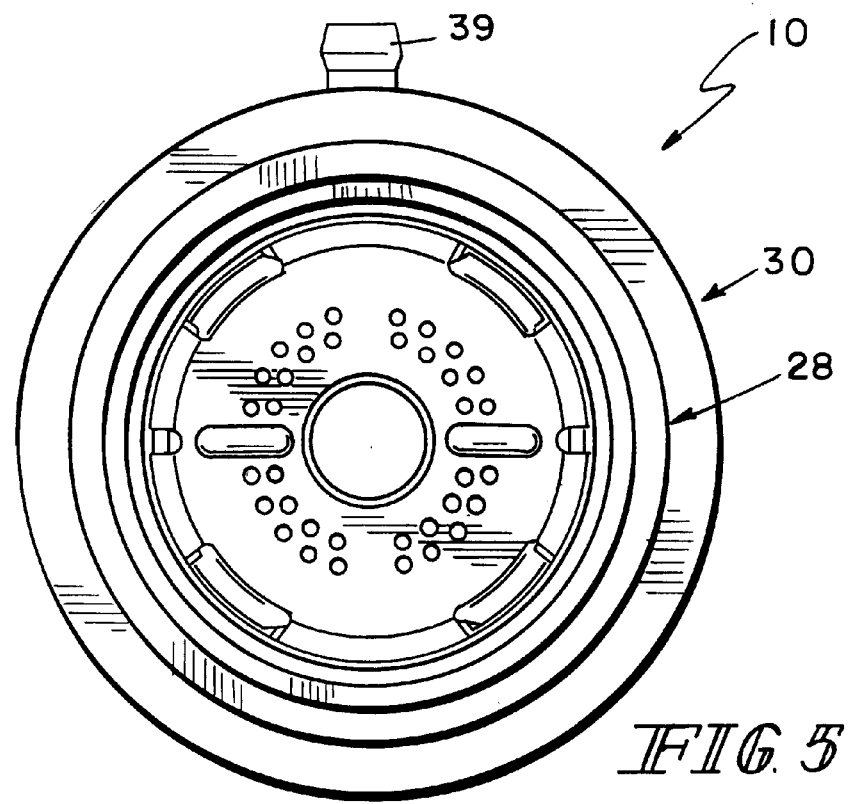
FIG. 5 is a bottom view of the vent apparatus of FIG. 2.
Figure 6:
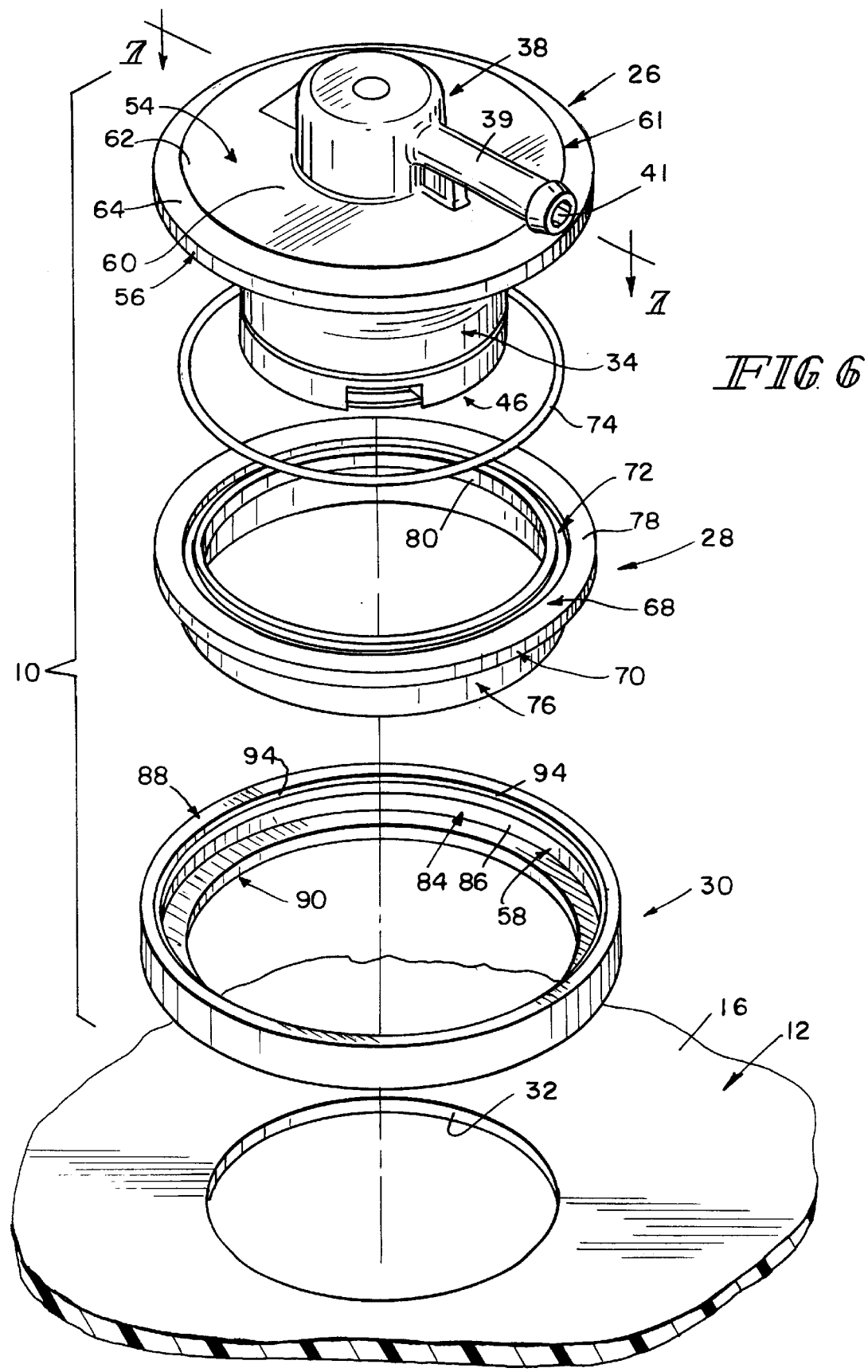
Figure 7:
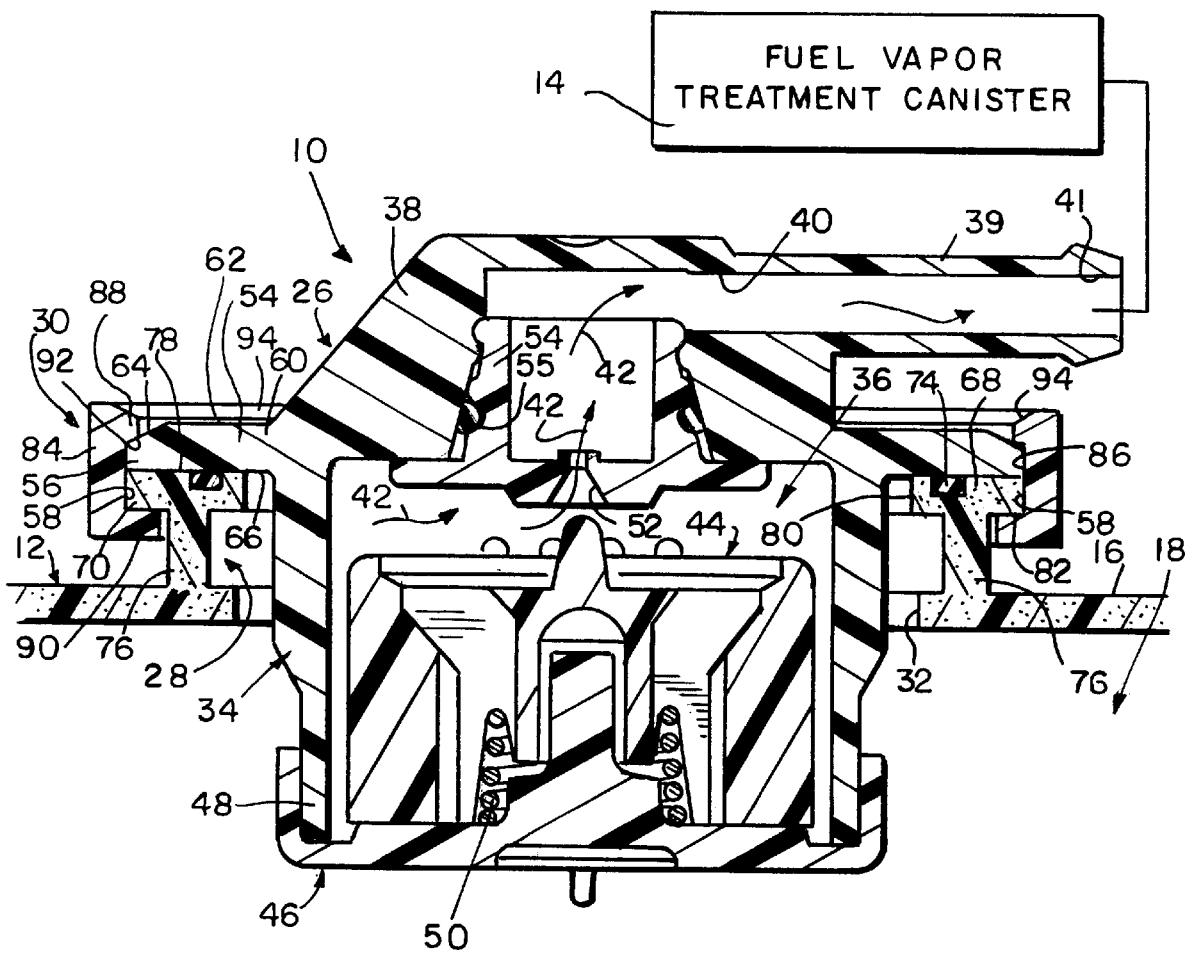

FIG. 6 is a perspective assembly view of the vent apparatus of FIG. 2 showing a valve housing made of a non-weldable plastics material, a seal under the valve housing, a tank mount made of a weldable plastics material and shown to lie under the seal, and a retainer ring under the tank mount and over a mounting aperture formed in the top wall of a fuel tank made of a weldable plastics material that can be welded using any suitable means to the tank mount; and FIG. 7 is a sectional view taken along line 7—7 of FIG. 6 after assembly of the components shown in FIG. 6 to form a vent apparatus and installation of that vent apparatus in a mounted position in the mounting aperture formed in the top wall of the tank and showing a movable valve contained in the valve housing, formation of the retainer ring to include an annular channel opening toward the valve housing and receiving both a non-weldable upper flange of the valve housing and a weldable lower flange of the tank mount to couple the upper and lower flanges together to trap a seal therebetween, and a base portion of the tank mount welded to the top wall of the underlying fuel tank.

DETAILED DESCRIPTION OF THE DRAWINGS

A vent apparatus 10 is mounted in an aperture formed in a fuel tank 12 as shown in FIG. 1 to regulate flow of liquid fuel and fuel vapor from tank 12 to a fuel vapor treatment canister 14 or other destination outside tank 12. Tank 12 includes a top wall 16 overlying an interior region 18 containing liquid fuel 20 and a filler neck 22 receiving a fuel-dispensing pump nozzle 24 operable to dispense more liquid fuel 20 into tank 12.

Tank 12 is made of a weldable plastics material such as high density polyethylene (HDPE). As shown, for example, in FIGS. 1 and 7, vent apparatus 10 includes a valve housing 26 made of any suitable structural, engineering grade plastics material such as acetal, a tank mount 28 made of a weldable plastics material that can be welded using any suitable technique to fuel tank 12, and a retainer 30 arranged to couple valve housing 26 to tank mount 28 to anchor valve housing 26 in a mounting aperture 32 formed in top wall 16 of tank 12.

Because valve housing 26 is made of acetal, it is not weldable directly to fuel tank 12 since acetal material cannot be welded to HDPE material. Weldable tank mount 28 is provided to mount a fuel system component such as a valve assembly including a valve 44 contained inside valve housing 26.

Valve housing 26 includes a sleeve 34 formed to include an interior region 36 and a venting outlet 38 formed to include a passageway 40 arranged to conduct fuel vapor 42 from interior region 36 to fuel vapor treatment canister 14 whenever a valve 44 contained in sleeve 34 has been moved to an "opened" position as shown, for example, in FIG. 7. A valve support 46 is coupled to a lower end 48 of sleeve 34 to support valve 44 and a spring 50 is arranged to urge valve 44 upwardly toward a venting aperture 52 formed in a plug 54 and located to interconnect interior region 36 of sleeve 34 and passageway 40 of venting outlet 38 in fluid communication. It is within the scope of this disclosure to use any suitable valve system inside valve housing 26 to regulate flow of liquid fuel and fuel vapor from interior region 18 of fuel tank 12 to fuel vapor treatment device 18 through passageway 40.

An upper flange 54 is included in valve housing 26 and positioned to lie outside of interior region 36 of sleeve 34. A radially outer perimeter edge 56 of upper flange 54 extends into an upper portion of an annular channel 58 formed in retainer 30 as shown, for example, in FIG. 7. Upper flange 54 includes a radially inner portion 60 appended to sleeve 34 and venting outlet 38 at a junction therebetween. Upper flange 54 is ring-shaped and extends radially outwardly from a cylindrical exterior wall of sleeve 34 to overlie a portion of top wall 16 of tank 12 that lies around mounting aperture 32 formed in top wall 16.

As shown best in FIGS. 6 and 7, upper flange 54 of valve housing 26 includes an axially upwardly facing surface 61 including a radially inner annular top wall 62 adjacent to venting outlet 38 and a radially outer annular cone-shaped beveled wall 64 surrounding annular top wall 62. Upper flange 54 also includes an axially downwardly facing surface 66 facing toward the underlying tank mount 28.

Tank mount 28 is illustrated, for example, in FIGS. 6 and 7 and functions to support valve housing 26 in a mounted position in mounting aperture 32 formed in top wall 16 of fuel tank 12. Tank mount 28 is made of a weldable plastics material such as HDPE so that it can be coupled to top wall 16 of tank 12 using any suitable welding technique. It is within the scope of this disclosure to use the weldable tank mount 28 to support other fuel system components (not shown) such as a fuel sender unit or other type of valve in a fuel tank or other tank.

Tank mount 28 includes a lower flange 68 lying under upper flange 54 of valve housing 26. A radially outer perimeter edge 70 of lower flange 68 extends into a lower portion of annular channel 58 formed in retainer 30 as shown in FIG. 6. In the illustrated embodiment, lower flange 68 is formed to include an annular groove 72 sized to receive a seal 74 as shown in FIGS. 6 and 7. Seal 74 functions to provide a sealed connection between upper and lower flanges 54, 68 upon extension of those flanges into annular channel 58 formed in retainer 30. In a preferred embodiment, seal 74 is an o-ring.

A base portion 76 is included in tank mount 28 and appended to an underside of lower flange 68 as shown, for example, in FIG. 7. Base portion 76 is adapted to be welded to the underlying fuel tank 12. In the illustrated embodiment, lower flange 68 and base 76 are arranged relative to one another to provide tank mount 28 with a "T-shaped" cross section. It is within the scope of this disclosure to provide tank mount 28 with other cross-sectional shapes.

As shown in FIGS. 6 and 7, lower flange 68 includes an axially upwardly facing surface 78 facing toward the overlying upper flange 54 and having an opening into annular groove 72. Lower flange 68 also includes a radially inwardly facing perimeter edge 80 surrounding sleeve 34 and lying in spaced-apart relation to sleeve 34 to define an annular space therebetween and an axially downwardly facing annular surface 82 extending around base portion 76 and engaging retainer 30.

Retainer 30 functions to retain upper and lower flanges 54, 68 in fixed position relative to one another to trap seal 74 therebetween. In the illustrated embodiment, retainer 30 is a ring positioned to extend around portions of valve housing 26 and tank mount 28. Retainer 30 is made of acetal in a preferred embodiment.

Retainer 30 includes a middle portion 84 having a radially inwardly facing wall 86 engaging radially outwardly facing edges 56, 70 of upper and lower flanges 54, 68, respectively. Retainer 30 further includes an upper retainer 88 coupled to middle portion 84 and arranged to engage axially upwardly facing surface 61 of upper flange 54. Retainer 30 also includes lower retainer 90 coupled to middle portion 84 and arranged to engage axially downwardly facing annular surface 82 of lower flange 68. Middle portion 84 cooperates with upper and lower retainers 88, 90 to define annular channel 58 as shown in FIGS. 6 and 7.

When retainer 30 is installed in vent apparatus 10, an axially downwardly facing, radially inwardly sloping and extending cone-shaped beveled wall 92 included in upper retainer 88 engages the radially outer annular cone-shaped beveled wall 64 of upper flange 68. Upper retainer 88 also includes an axially upwardly facing, radially outwardly sloping, radially inwardly extending, cone-shaped beveled wall 94.

Referring again to FIG. 7, valve housing 26 is preferably formed to include integral upper and lower housing portions. The upper housing portion includes annular upper flange 54 and a venting outlet 30 coupled to and positioned to lie above annular upper flange 54. Venting outlet 38 includes a discharge tube 39 containing a portion of vent passageway 40 and terminating at a discharge port 41. The lower housing portion of valve housing 26 includes cylindrical sleeve 34.

Valve 44 is positioned to move in a vent chamber provided by interior region 36 formed in sleeve 34 to open and close inlet 52 in vent passageway 40. A seal 55 such as a nitrile o-ring is provided as shown in FIG. 7 to establish a liquid-fuel and fuel-vapor seal between plug 54 and venting outlet 38. Although valve 44 is a conventional float valve made of a buoyant material, any suitable closure valve could be used in interior region 36 of sleeve 34. In the illustrated embodiment, float valve 44 is biased in an upward direction by a coiled compression spring 50 made of stainless steel wire that is coupled to float valve 44 and arranged to act against valve support 46 so that float valve 44 can move upwardly to close inlet 52 and vent passageway 40 when float valve 44 is exposed to a rising level of liquid fuel 20 inside interior region 18 of fuel tank 12.

Retainer 30 is configured to snap onto upper and lower flanges 54, 68 to retain the HDPE tank mount 28 in a fixed position under the acetal upper flange 54 of valve housing 26 to form a sub-assembly including valve housing 26, valve 44, tank mount 28, and retainer 30. Such a snap fit is made easier by the presence of axially upwardly extending, cone-shaped beveled wall 94 on upper retainer 88 of retainer 30. The lower housing portion 34 of valve housing 26 can be inserted into mounting aperture 32 formed in top wall 16 of tank 12 and HDPE tank mount 28 wlded to HDPE top wall 16 to fix vent apparatus 10 in place in fuel tank 12.

Although the invention has been disclosed in detail with reference to certain preferred embodiments, variations and modifications exist within the scope and spirit of the invention as described and defined in the following claims.

What is claimed is:

1. A vent apparatus adapted to be coupled to a fuel tank, the apparatus comprising a valve housing made of a non-weldable plastics material, the valve housing including a sleeve formed to include an interior region and a venting outlet arranged to conduct fuel vapor from the interior region of the sleeve through a vent passageway to a destination outside the valve housing, the valve housing further including an upper flange positioned to lie outside of the interior region, a valve positioned to lie inside the interior region of the sleeve, the valve being arranged to move within the interior region to open and close a venting aperture interconnecting the interior region of the sleeve and the vent passageway of the venting outlet, a tank mount made of a weldable plastics material, the tank mount including a lower flange positioned to face toward the upper flange of the valve housing, the tank mount further including a base portion appended to the lower flange and adapted to be welded to an underlying fuel tank to support the valve housing within a mounting aperture formed in the fuel tank, a seal positioned to lie between the upper flange of the valve housing and the lower flange of the tank mount, and means for coupling the lower flange to the upper flange to trap the seal therebetween, the coupling means extending around the upper and lower flanges.

2. The apparatus of claim 1, wherein the coupling means is a ring arranged to surround the upper and lower flanges.

3. The apparatus of claim 2, wherein the upper flange is ring-shaped and includes a perimeter edge arranged to engage a radially inwardly facing wall of the ring.

4. The apparatus of claim 3, wherein the ring includes an annular upper retainer arranged to extend in a radially inward direction from an upper edge of the radially inwardly facing wall of the ring to engage an axially upwardly facing surface of the upper flange and an annular lower retainer arranged to extend in a radially inward direction from a lower edge of the radially inwardly facing wall of the ring to engage an axially downwardly facing surface of the lower flange.

5. The apparatus of claim 3, wherein the upper flange includes an axially upwardly facing surface having a radially inner annular top wall adjacent to the venting outlet and a radially outer annular cone-shaped beveled wall positioned to lie between the radially inwardly facing wall of the ring and the radially inner annular top wall and to engage a radially inwardly extending portion of the ring.

6. The apparatus of claim 3, wherein the lower flange is ring-shaped and includes a perimeter edge arranged to engage the radially inwardly facing wall of the ring.

7. The apparatus of claim 2, wherein the ring includes a middle portion arranged to engage radially outwardly facing perimeter edges of the upper and lower flanges, an upper retainer arranged to engage an axially upwardly facing surface of the upper flange, and a lower retainer arranged to engage an axially downwardly facing surface of the lower flange.

8. The apparatus of claim 7, wherein the axially upwardly facing surface of the upper flange includes a radially inner annular top wall adjacent to the venting outlet and a radially outer annular cone-shaped beveled wall positioned to lie between the middle portion of the ring and the radially inner annular top wall and to engage the upper retainer of the ring.

9. The apparatus of claim 7, wherein the lower retainer of the ring includes an axially upwardly facing annular surface engaging an axially downwardly facing annular surface of the lower flange.

10. The apparatus of claim 9, wherein the lower retainer of the ring further includes a radially inwardly facing annular surface underlying the axially downwardly facing annular surface of the lower flange and engaging a radially outwardly facing annular surface of the base portion of the tank mount.

11. The apparatus of claim 2, wherein the ring is formed to include an annular channel and upper and lower flanges are arranged to extend into the annular channel.

12. The apparatus of claim 11, wherein the base portion of the tank mount is positioned to lie outside the annular channel formed in the ring.

13. The apparatus of claim 11, wherein the ring includes an annular middle portion positioned to surround the sleeve and form an annular space therebetween communicating with the annular channel and receiving the lower flange of the tank mount therein and the ring further includes a lower retainer extending from the middle portion radially inwardly toward the sleeve to define an annular space therebetween receiving the base portion of the tank mount therein.

14. The apparatus of claim 1, wherein the coupling means is made of a non-weldable material and includes an upper retainer engaging an axially upwardly facing surface of the upper flange of the valve housing and a lower retainer engaging an axially downwardly facing surface of the lower flange of the tank mount.

15. The apparatus of claim 14, wherein the coupling means further includes a middle portion arranged to interconnect the upper and lower retainers and to lie around and face toward radially outwardly facing perimeter edges of the upper and lower flanges.

16. The apparatus of claim 14, wherein the axially upwardly facing surface of the upper flange has a radially outer annular cone-shaped beveled wall and a radially inner annular top wall positioned to lie adjacent to the venting outlet and between the venting outlet and the radially outer annular cone-shaped beveled wall, and the upper retainer of the coupling means engages the radially outer annular cone-shaped beveled wall of the upper flange of the valve housing.

17. The apparatus of claim 16, wherein the upper retainer includes a radially inner annular cone-shaped beveled wall engaging and mating with the radially outer annular cone-shaped beveled wall of the upper flange.

18. The apparatus of claim 14, wherein the upper retainer includes an axially upwardly facing, radially outwardly sloping, radially inwardly extending cone-shaped beveled wall.

19. The apparatus of claim 18, wherein the upper retainer further includes an axially downwardly facing, radially inwardly sloping and extending cone-shaped beveled wall arranged to engage the upper flange of the valve housing.

20. The apparatus of claim 1, wherein the tank mount has a T-shaped cross section.

21. A vent apparatus adapted to be coupled to a fuel tank, the apparatus comprising a valve housing made of a non-weldable plastics material, the valve housing including a sleeve formed to include an interior region and a venting outlet arranged to conduct fuel vapor from the interior region of the sleeve through a vent passageway to a destination outside the valve housing, the valve housing further including an upper flange positioned to lie outside of the interior region, a valve positioned to lie inside the interior region of the sleeve, the valve being arranged to move within the interior region to open and close a venting aperture interconnecting the interior region of the sleeve and the vent passageway of the venting outlet, a ring positioned to extend around the valve housing, the ring being formed to include an annular channel opening toward the valve housing, the upper flange of the valve housing including a radially outer perimeter edge extending into the annular channel formed in the ring, a tank mount made of a weldable plastics material, the tank mount including a lower flange lying under the upper flange of the valve housing, the lower flange including a radially outer perimeter edge extending into the annular channel formed in the ring, the tank mount further including a base portion appended to the lower flange and adapted to be welded to an underlying fuel tank to support the valve housing within a mounting aperture formed in the fuel tank, and means for establishing a sealed connection between the upper and lower flanges upon extension of the upper and lower flanges into the annular channel formed in the ring.

22. The apparatus of claim 21, wherein the tank mount has a T-shaped cross section.

23. The apparatus of claim 22, wherein the lower flange further includes a radially inwardly facing perimeter edge surrounding the sleeve and lying in spaced-apart relation to the sleeve to define an annular space therebetween.

24. The apparatus of claim 22, wherein the lower flange further includes an axially downwardly facing annular surface extending around the base portion and engaging an axially upwardly facing surface of the ring.

25. The apparatus of claim 21, wherein the ring includes a middle portion arranged to engage radially outwardly facing perimeter edges of the upper and lower flanges, an upper retainer arranged to engage an axially upwardly facing surface of the upper flange, and a lower retainer arranged to engage an axially downwardly facing surface of the lower flange and the middle portion cooperates with the upper and lower retainers to define the annular channel formed in the ring.

26. The apparatus of claim 25, wherein the axially upwardly facing surface of the upper flange includes a radially inner annular top wall adjacent to the venting outlet and a radially outer annular cone-shaped beveled wall positioned to lie between the middle portion of the ring and the radially inner annular top wall and to engage the upper retainer of the ring.

27. The apparatus of claim 25, wherein the lower retainer of the ring includes an axially upwardly facing annular surface engaging an axially downwardly facing annular surface of the lower flange.

28. The apparatus of claim 27, wherein the lower retainer of the ring further includes a radially inwardly facing annular surface underlying the axially downwardly facing annular surface of the lower flange and engaging a radially outwardly facing annular surface of the base portion of the tank mount.

29. A vent apparatus adapted to be coupled to a fuel tank, the apparatus comprising a valve housing made of a non-weldable plastics material, the valve housing including a sleeve formed to include an interior region and a venting outlet arranged to conduct fuel vapor from the interior region of the sleeve through a vent passageway to a destination outside the valve housing, the valve housing further including an upper flange positioned to lie outside of the interior region, a valve positioned to lie inside the interior region of the sleeve, the valve being arranged to move within the interior region to open and close a venting aperture interconnecting the interior region of the sleeve and the vent passageway of the venting outlet, a seal positioned to lie under the upper flange, a retainer ring positioned to extend around the valve housing and engage the upper flange of the valve housing to limit axial movement of the upper flange away from the seal, and a tank mount made of a weldable plastics material, the tank mount including a base potion adapted to be welded to an underlying fuel tank to support the valve housing within a mounting aperture formed in the fuel tank, the tank portion further including a lower flange appended to the base portion and arranged to mate with the upper flange of the valve housing to trap the seal ring therebetween and engage a portion of the retainer ring to limit axial movement of the lower flange away from the upper flange.

* * * * *